April 4, 1967 R. J. FACE 3,312,340
SKIN PACKAGE FOR BOTTLES AND OTHER OBJECTS
Filed Dec. 27, 1965 2 Sheets-Sheet 1

INVENTOR.
Rolland J. Face
BY
*Lloyd E. Hessenaugh*
ATTORNEY

April 4, 1967 R. J. FACE 3,312,340
SKIN PACKAGE FOR BOTTLES AND OTHER OBJECTS
Filed Dec. 27, 1965 2 Sheets-Sheet 2

INVENTOR.
Rolland J. Face
BY
ATTORNEY bottom

3,312,340
SKIN PACKAGE FOR BOTTLES AND OTHER OBJECTS

Rolland J. Face, Midland, Mich., assignor to The Dow Chemical Company, Midland, Mich., a corporation of Delaware
Filed Dec. 27, 1965, Ser. No. 516,562
7 Claims. (Cl. 206—80)

This invention relates to an improved sealed package for a plurality of articles which can be kept in a substantially dust-free state even after the package is opened.

While the present invention can have many and varied applications, the particular environment for which the present invention can find exceedingly important use is in the packaging of small pharmaceutical containers such as those used for dispensing pills and the like. It is typical for manufacturers to package up to 1600 such containers in four layers within a corrugated cardboard box, each layer being separated by corrugated paperboard dividers. It has not been uncommon for druggists to experience the problem of excessive dust collecting in remaining containers once a prior art package had been earlier opened to remove a few containers. The present invention provides a solution to this dust problem by separately sealing each layer with respect to the others and by providing a hinged cover divider for each layer which can be opened and closed as individual items are removed therefrom.

Briefly, the invention comprises a package and a carton containing such packages wherein individual containers are placed end down against a backing board, a blister-type plastic film skin having been pulled down around the containers and adhered to the backing to secure the containers against the backing. By partially separating the skin about the periphery of the containers, a hinged cover can be formed by the backing, which cover rests against the ends of the containers. The character of the resin forming the skin permits it to tack slightly to the containers and pockets are formed for the containers in the skin thereby keeping all of the containers in place until it is desired to remove them either in a group or individually. The containers are thus kept from scuffing one another in shipment and remain in position and substantially clean until the last one is dispensed.

Yet additional objects and advantages of the present invention are even more apparent in the ensuing description, taken in conjunction with the accompanying drawing in which.

Figure 1:
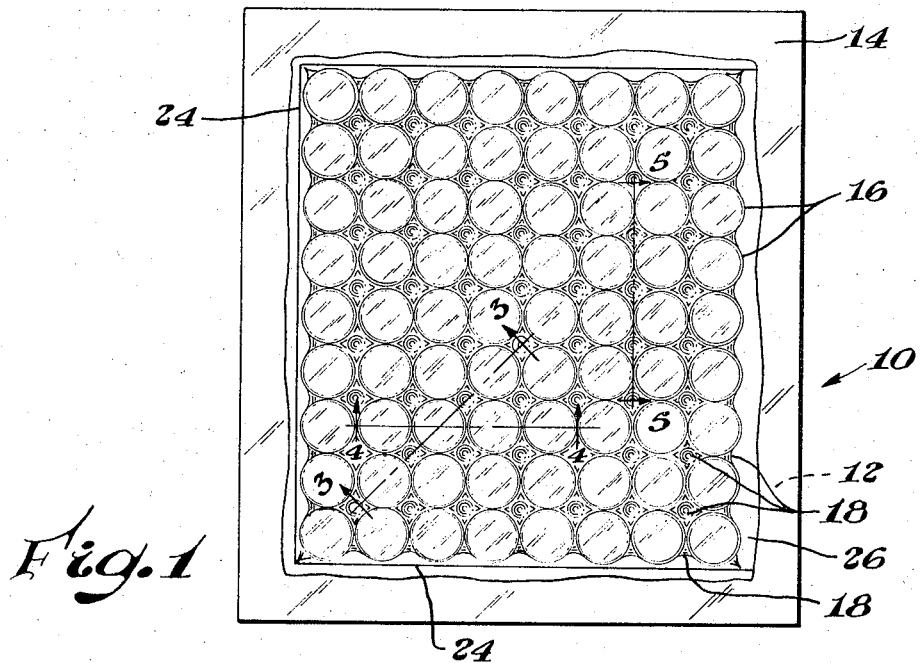
FIGURE 1 is a plan view of a package illustrating a preferred embodiment of the present invention.

Referring now more particularly to the drawing, package 10 comprises a backing 12, a skin 14 and a plurality of objects 16, such as small individual containers or bottles, located therebetween.

The backing 12 can be of numerous materials like non-coated paper, corrugated cardboard, paperboard, perforated or coated films, or any open celled or perforated plastic foam to which a plastic film skin 14 can be heat or adhesively sealed. The plastic films which can serve as skins 14 can be electrostatically treated polyethylene or acrylic acid modified polyethylene, for example, as described in somewhat more detail hereinbelow. Generally, any well-known skin packaging combination can conceivably satisfy the skin/backing requirements of this invention. One such other common skin/backing combination, for example, is a non-treated polyethylene film skin heat sealed to a perforated polyethylene coated paperboard backing. Skin 14 can be heat sealed to the backing 12 in a fashion such as taught by U.S. Patents 3,031,072 and 3,154,898, for example. This invention can be employed for the packaging of objects 16 formed of polystyrene, glass, wood, painted wood, ceramic and iron, for example, if the proper temperature-time-pressure relationship is employed. It is expected that numerous other plastic, organic, metallic, etc., objects can likewise be packaged.

For purposes of illustration, two such packages were formed using an Abbott Machine Model No. AM 2434, manufactured by Plastics Machine Corporation, of Chicago, Ill. The first was formed of a 5½ mil thick polyethylene film skin electrostatically treated on one side (the bonding side) and a non-coated natural kraft corrugated paperboard backing. The second was formed of a 5½ mil thick film skin made from an ethylene/acrylic acid copolymer resin, sold by The Dow Chemical Company under its designation QX 3456.2, and a non-coated natural kraft corrugated paperboard backing. In both cases uncapped No. 5 size polystyrene pharmaceutical bottles were packaged, the bottles being placed open end down against the backing.

In the first package a vacuum draw of 20 inches was applied, there was 17 seconds of drape time (heating cycle), 1 second of oven hold time, and 10 seconds of vacuum hold time while the package was cooling. The conditions for the second package were the same with the exception that the drape time was only 12 seconds. Both packages were of high quality and performed as described herein.

Figure 2:
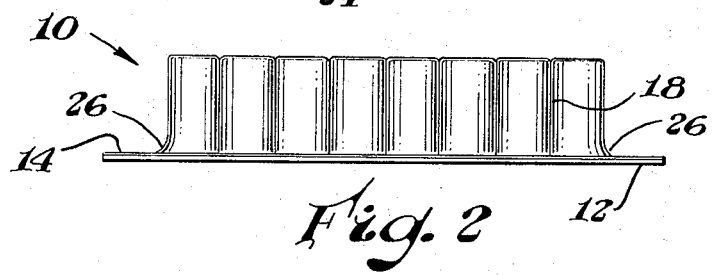
FIGURE 2 is a side elevational view thereof, all sides appearing substantially the same except for the number of objects in a row.
Figure 3:
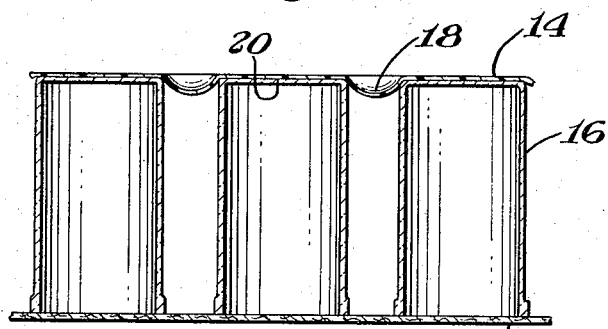
FIGURE 3 is an enlarged cross-sectional view thereof taken along the line 3—3 of FIGURE 1.
Figure 4:
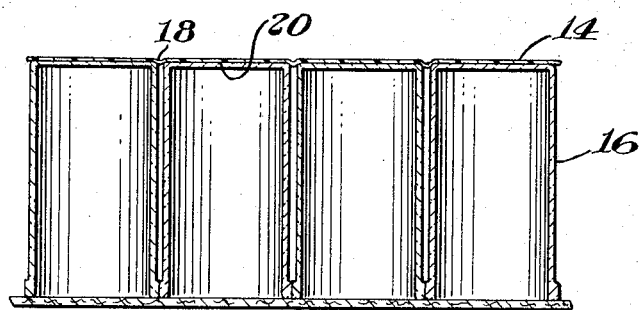
FIGURE 4 is an enlarged cross-sectional view thereof taken along the line 4—4 of FIGURE 1.
Figure 5:
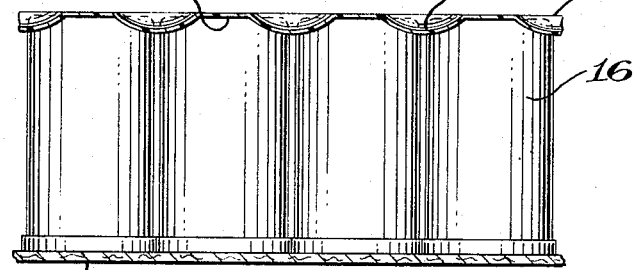
FIGURE 5 is an enlarged cross-sectional view thereof taken along the line 5—5 of FIGURE 1.

Skin 14, being of a heat sealable resin in its preferred embodiment, fits tightly about each of the individual bottles 16 as a result of vacuum drawing to the extent that the base of each bottle is located in a pocket 20 which serves to keep the bottles in a specific relationship to one another. Pockets 20 are formed by the depressions 18 (formed by vacuum drawing through and/or around backing 12) of the skin 14 between each of the bottles 16 as seen in FIGURES 3 to 5. Depressions 18 also extend downwardly around the peripheral rows of bottles in the package as seen most clearly in FIGURE 2. Depressions 18 even appear slightly where the bottles 16 almost rest against one another (FIGURE 4). It can thus be appreciated that each bottle 16 has its own pocket 20 formed by the skin 14 shrinking about the container's end.

Figure 6:
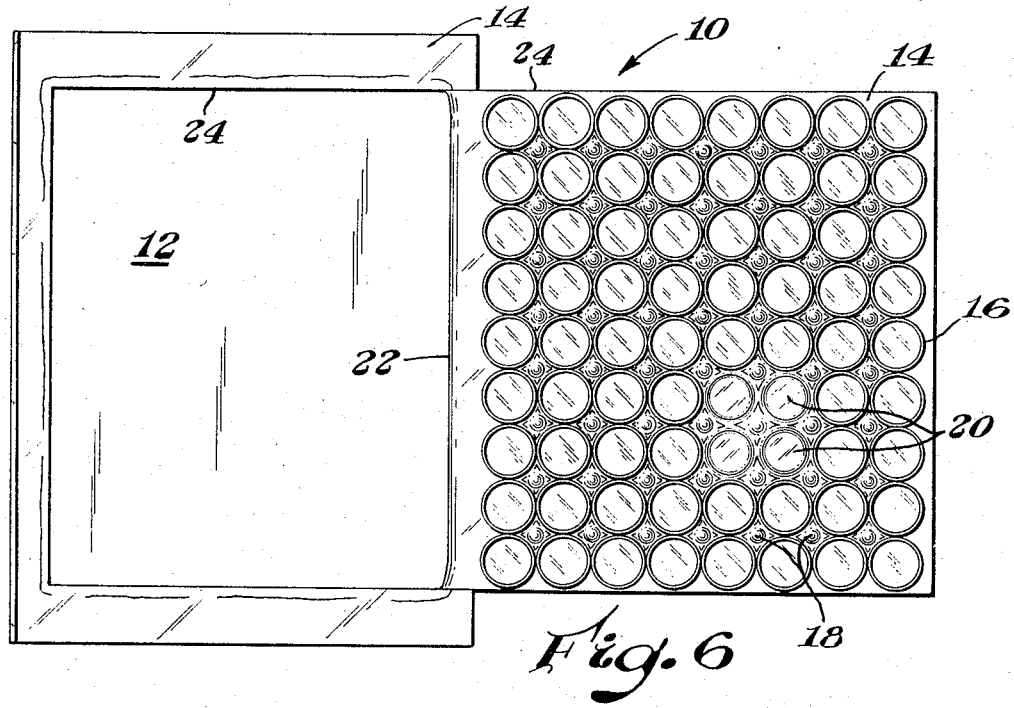
FIGURE 6 is a plan view thereof with the package opened and some objects removed.

The tacky nature of the usual skin 14 has been discovered to readily secure each of the bottles 16 to its respective pocket 20. However, the bottles are not so tightly held that they cannot be easily separated from their pockets by simply pulling on them by hand. FIGURE 6 illustrates a package 10 having four bottles 16 so removed therefrom, as indicated by empty pockets 20.

To open the package 10 it is only necessary to slit or otherwise separate the skin 14 partially about its periphery along line 24, for example. In this instance, separating line 24 extends around three of the four peripheral sides of skin 14. The fourth uncut side serves as a hinge 22 so that the backing 12 can perform the function of a cover once an individual bottle is removed and it is desired to reclose the package. The slitting can be achieved by cutting with a sharp blade, pushing on a perforated tear line, pulling on a tear string, or by any other equivalent conventional separating technique. The separating line 24 (either indicated or imaginary) should be in the curved area 26 of skin 14 between the backing 12 and bottles 16 where the skin 14 is not adhered to one or the other or to either the backing and bottles.

It can readily be appreciated that the backing 12 also serves as a divider so that a package 10 can be a sealed layer in a carton (not shown) containing layers for shipping and storage purposes.

While certain representative embodiments and details have been shown for the purpose of illustrating the invention, it will be apparent to those skilled in the art that various changes and modifications can be made therein without departing from the spirit and scope of the invention.

Accordingly, what is claimed as new is:

1. A package comprising a backing, a plurality of objects located on said backing in a specific relationship with one another, a plastic film skin covering said objects and secured to said backing about the periphery of said objects, a separating line located in a curved area of said film skin between said backing and said objects wherein said skin is not engaged with at least one of said backing and said objects, said line extending partially about the peripheral extent of said skin whereby when said skin is separated about said line a hinge is formed along the remaining non-separated peripheral extent of said skin, said backing serving as a book-type cover for said package.

2. The package of claim 1 wherein an individual pocket for an end of each object is formed in said skin.

3. The package of claim 2 wherein each object is adhered to each pocket by the tacky characteristic of said skin, said adherence being sufficient to hold said object in place until pulled out.

4. The package of claim 3 wherein each object is an open-mouthed container having its mouth flush against said backing.

5. The package of claim 4 wherein said skin is a polyethylene film, said backing is paperboard and said containers are polystyrene bottles.

6. The package of claim 4 wherein said skin is an acrylic acid modified polyethylene film, said backing is paperboard and said containers are polystyrene bottles.

7. A carton including a plurality of layers, each of said layers being individually sealed and comprising a backing, a plurality of objects located on said backing in a specific relationship with one another, a plastic film skin covering all of said objects and secured to said backing about the periphery of said objects, a separating line located in a curved area of said film skin between said backing and said objects wherein said skin is not engaged with at least one of said backing and said objects, said line extending partially about the peripheral extent of said skin whereby when said skin is separated about said line a hinge is formed along the remaining non-separated peripheral extent of said skin, said backing serving as a book-type cover for each said layer.

References Cited by the Examiner

UNITED STATES PATENTS

| | | | |
|---|---|---|---|
| 2,558,904 | 7/1951 | Kohl | 206—7 X |
| 2,719,663 | 10/1955 | Meyer-Jagenberg | 229—17 X |
| 2,876,899 | 3/1959 | Maynard | 206—80 |
| 3,105,376 | 10/1963 | Haslett. | |
| 3,190,050 | 6/1965 | Kirkpatrick | 53—30 |
| 3,197,026 | 7/1965 | Gabryel | 206—80 |
| 3,217,462 | 11/1965 | Watts | 53—30 |

THERON E. CONDON, *Primary Examiner.*

J. M. CASKIE, *Assistant Examiner.*